United States Patent
Weiss

(10) Patent No.: US 10,293,865 B2
(45) Date of Patent: May 21, 2019

(54) SIDE COMPONENT, AND VEHICLE HAVING A SIDE COMPONENT

(71) Applicant: Dr. Ing. h.c. F. Porsche Aktiengesellschaft, Stuttgart (DE)

(72) Inventor: Thomas Weiss, Tamm (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 0 days.

(21) Appl. No.: 15/695,108

(22) Filed: Sep. 5, 2017

(65) Prior Publication Data
US 2018/0065685 A1 Mar. 8, 2018

(30) Foreign Application Priority Data
Sep. 7, 2016 (DE) .................. 10 2016 116 701

(51) Int. Cl.
| | | |
|---|---|---|
| *B60K 13/02* | (2006.01) | |
| *B62D 25/16* | (2006.01) | |
| *B60K 13/04* | (2006.01) | |
| *B01D 46/00* | (2006.01) | |
| *B62D 25/02* | (2006.01) | |
| *B62D 25/08* | (2006.01) | |

(52) U.S. Cl.
CPC ....... *B62D 25/163* (2013.01); *B01D 46/0005* (2013.01); *B60K 13/02* (2013.01); *B60K 13/04* (2013.01); *B62D 25/02* (2013.01); *B62D 25/08* (2013.01); *B62D 25/088* (2013.01)

(58) Field of Classification Search
CPC ........ B62D 25/02; B60K 11/08; B60K 13/06; B60K 13/02; B60K 13/04
See application file for complete search history.

(56) References Cited

U.S. PATENT DOCUMENTS

| 3,084,972 A | * | 4/1963 | Gibson | B60K 13/06 296/208 |
| 6,237,990 B1 | * | 5/2001 | Barbier | B62D 25/082 296/187.09 |
| 7,374,233 B2 | * | 5/2008 | Li | B60S 1/50 296/193.09 |
| 8,348,333 B2 | * | 1/2013 | Iammarino | B62D 25/161 296/187.09 |
| 8,708,075 B2 | * | 4/2014 | Maurer | B60R 19/52 180/68.1 |
| 9,677,517 B2 | * | 6/2017 | Roten | F02M 35/161 |

(Continued)

FOREIGN PATENT DOCUMENTS

| DE | 10 2008 062 006 | 6/2010 |
| DE | 10 2011 000 210 | 7/2012 |
| DE | 10 2014 116 612 | 5/2016 |

OTHER PUBLICATIONS

Aston 1936 (Dec. 2015): https://aston1936.com/2015/12/26/changing-the-air-filters-on-your-aston-martin-db9/.*

(Continued)

*Primary Examiner* — Emma K Frick
(74) *Attorney, Agent, or Firm* — Gerald E. Hespos; Michael J. Porco; Matthew T. Hespos

(57) ABSTRACT

A side component is provided for fastening to a vehicle frame. The side component has a receiving region for a vehicle trim panel, in particular a rear trim panel, and a receiving region for a wheel arch liner. The side component further is configured for receiving an air filter.

5 Claims, 3 Drawing Sheets

(56) References Cited

U.S. PATENT DOCUMENTS

| | | | |
|---|---|---|---|
| 9,884,555 B2* | 2/2018 | Tran .................. | B60K 35/00 |
| 2003/0160472 A1* | 8/2003 | Xia .................... | B60K 13/02 |
| | | | 296/65.09 |
| 2003/0183432 A1* | 10/2003 | Suzuki ............... | B60K 11/08 |
| | | | 180/68.1 |
| 2008/0315050 A1* | 12/2008 | Buckley .............. | B60R 19/483 |
| | | | 248/205.1 |
| 2014/0111950 A1* | 4/2014 | Yamasaki ........... | B60R 16/0239 |
| | | | 361/747 |
| 2017/0028950 A1* | 2/2017 | Keller ................. | B60R 19/00 |
| 2017/0297521 A1* | 10/2017 | Sugie ................. | G01S 7/4813 |

OTHER PUBLICATIONS

Aston Martin Car Parts Diagram 031200 ( May 2010): http://www.astonmartincarparts.com/imgrs/w950/images/diagrams/astonmartin/R627V44GPKZ76SAVCH78US2F9.gif.*

Aston 1936 diagram 010204 (Jul. 2007): https://aston1936.files.wordpress.com/2015/12/aston-martin-db9-front-wheel-arch-liner-parts-diagram.jpg.*

German Search Report dated May 26, 2017.

* cited by examiner

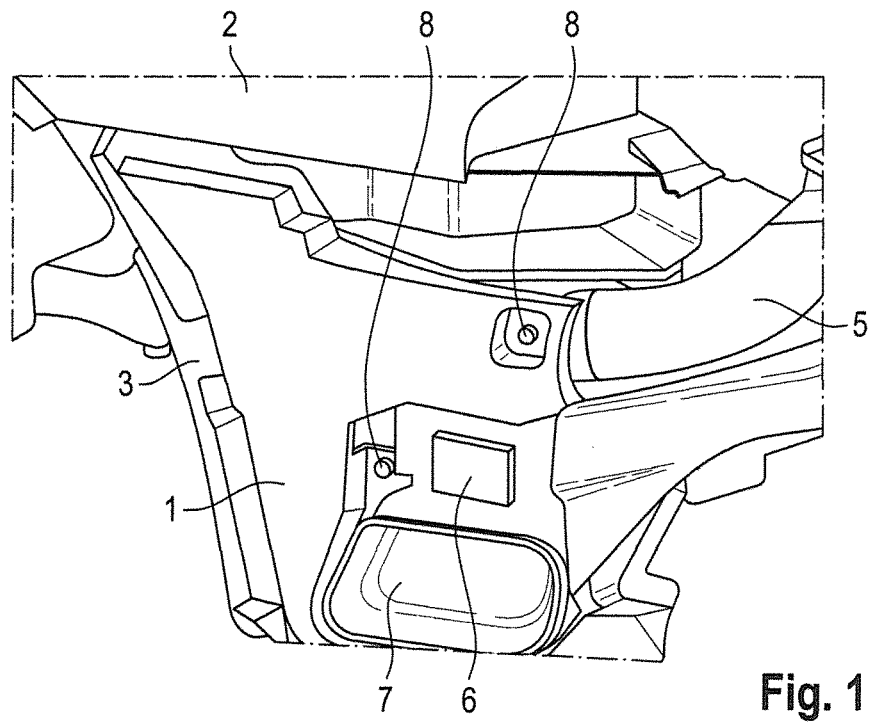
Fig. 1
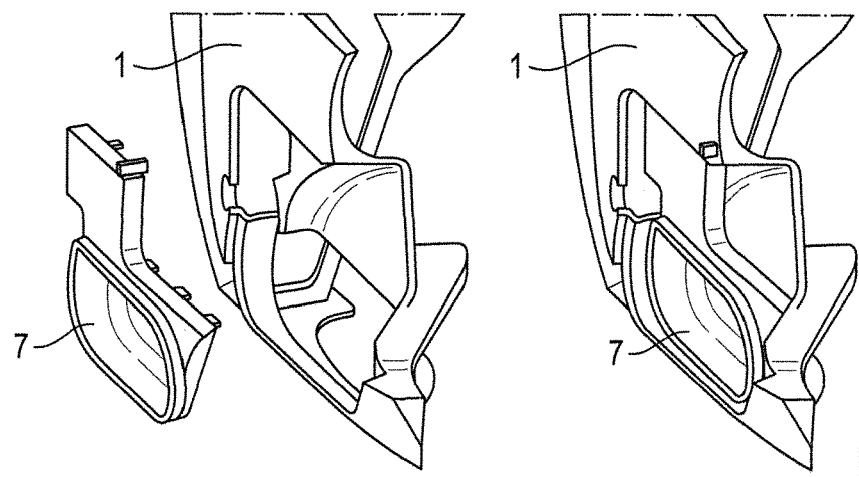
Fig. 2a                    Fig. 2b

SIDE COMPONENT, AND VEHICLE HAVING A SIDE COMPONENT

CROSS REFERENCE TO RELATED APPLICATION

This application claims priority under 35 USC 119 to German Patent Appl. No. 10 2016 116 701.0 filed on Sep. 7, 2016, the entire disclosure of which is incorporated herein by reference.

BACKGROUND

1. Field of the Invention

The invention relates to a side component and to a vehicle having a side component.

2. Description of the Related Art

DE 10 2008 062 006 A1 discloses a side component for fastening a vehicle trim panel and a wheel arch liner to a vehicle chassis or vehicle frame. Accordingly, the side component comprises a receiving region for the vehicle trim panel and a receiving region for the wheel arch liner.

It is an object of the present invention to further improve the side components that are known from the prior art.

SUMMARY

The invention relates to a side component for fastening to a vehicle frame. The side component has a receiving region for a vehicle trim panel and a receiving region for a wheel arch liner, and further is configured for receiving an air filter. The securing of the air filter makes additional fixing and stabilizing of the air filter possible.

The side component may have a receiving region for mounting and securing the air filter, and the air filter may be connected to the side component in the receiving region in the installed state. The receiving region for the air filter may be arranged on a side of the side component that side faces the vehicle frame or the chassis in the installed state of the side component. As a result, the air filter can advantageously be arranged between the side component and the vehicle frame. The air filter may be connected both to the vehicle frame and to the side component. The side component also may be strut-shaped at least in regions. For example, the side component may be riveted, screwed or welded to the vehicle frame in the installed state.

The receiving region for the wheel arch liner and the receiving region for the air filter may be designed so that, in the case of a dismantled wheel arch liner, an air filter component, such as an air filter cartridge, can be replaced via an opening in the receiving region for the wheel arch liner. As a result, the replacement of the air filter component is simplified, since replacement merely requires dismantling and mounting of a vehicle wheel and the wheel arch liner. In contrast to this, prior art side components require further working steps, such as dismantling and mounting of rear lights, the rear trim panel or an additional Z-shaped mount. To design the replacement region in such a way that an air filter component can be replaced via the receiving region, the side component may have an opening in the receiving region for the wheel arch liner. The opening may be dimensioned so that the air filter component can be guided or pushed through the opening.

The side component also may have a receiving region for an exhaust air duct, such as an exhaust air duct that can be pushed in from the side. The exhaust air duct and the side component may form a closed channel in the installed state.

The side component and/or the exhaust air duct may have a receiving region for a lane change assistant. The receiving region for the lane change assistant may be arranged so that a replacement of the lane change assistant or access to the lane change assistant is possible via the opening in the side component, such as the opening provided for the replacement of the air filter component.

The air filter, the lane change assistant and/or the exhaust air duct may be clipped into the side component in the installed state. As a result, the components provided for mounting on the side component can be fastened to the side component comparatively rapidly and simply. Cutouts for the respective clip mechanism may be made on the side component.

The side component may be manufactured from a plastic, in particular a plastic that comprises PA6-GF39. To save weight, the side component may be produced in a foam injection molding method or p-cell method. The exhaust air duct may be produced by a compact injection molding method. As a result, a surface that is more esthetically pleasing than the regions of the side component that are manufactured by the p-cell method can be realized in the visible part of the channel that is formed from the side component and the exhaust air duct.

The invention also relates to a vehicle having the side component described herein.

Further details and advantages of the invention result from the drawings and from the following description using the drawings. The drawings illustrate exemplary embodiments of the invention and do not restrict the essential concept of the invention.

BRIEF DESCRIPTION OF THE DRAWINGS

FIG. 1 shows a side component in accordance with one exemplary embodiment of the invention.

FIGS. 2a and 2b show the connection of an exhaust air duct to the side component of FIG. 1.

DETAILED DESCRIPTION

Figure 3A:
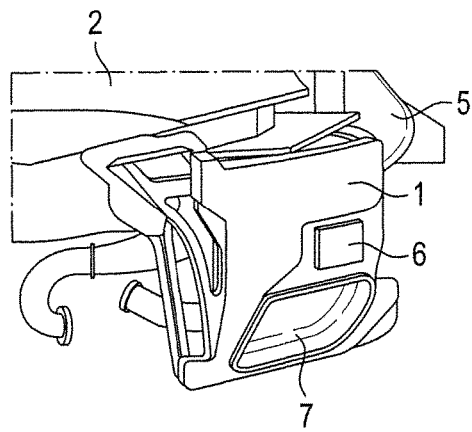
FIGS. 3a-3d show the side component from FIGS. 1 and 2 from four further perspectives.
Figure 3B:
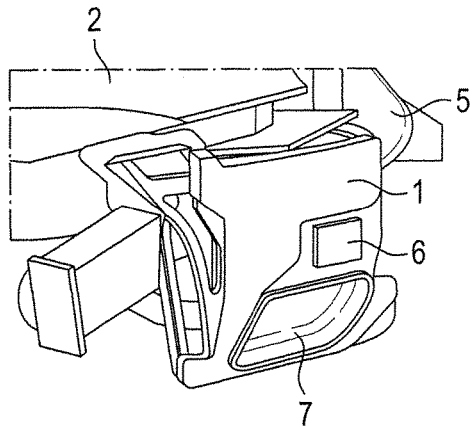
Figure 3C:
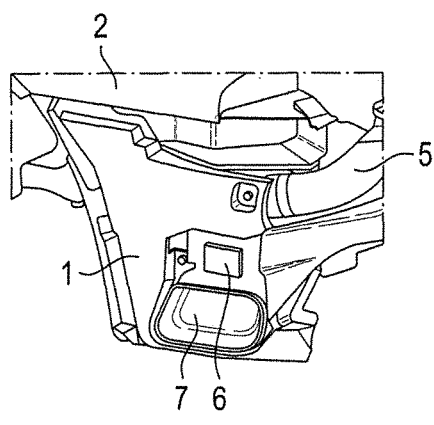
Figure 3D:
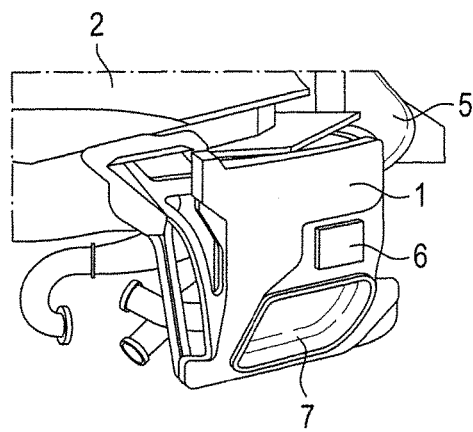

In the various figures, identical parts are always provided with the identical designations and therefore are indicated or mentioned as a rule in each case only once.

FIG. 1 shows a side component 1 in accordance with one embodiment of the invention. A component of this type is provided for mounting on a vehicle frame 2 of a vehicle. The side component 1 preferably is arranged in the rear region of the vehicle on the vehicle frame 2 and is screwed, riveted or welded, for example, to the vehicle frame 2. The primary function of the side component 1 is to hold a vehicle trim panel (not shown here), such as a part of a rear apron, and a wheel arch liner 3. To this end, the side component 1 is configured as a strut frame that preferably comprises reinforcing contours and has receiving regions in which the vehicle trim panel and the wheel arch liner 3 can be attached to the side component 1. For example, the side component 1 is curved in accordance with the shape of the wheel arch liner 3 so that the wheel arch liner 3 bears as flatly as possible against the side component 1 or a strut of the side component 1 in the installed state of the side component 1. In addition to the receiving regions for the vehicle trim panel and the wheel arch liner 3, the side component 1 has a receiving region for an air filter 5. The receiving region for the air filter 5 is arranged on a side of the side component 1 that faces away from the vehicle trim panel in the installed state. The air filter 5 advantageously also is supported by the side component 1 by the connection of the air filter 5 to the side component 1. The air filter 5 extends at least partially between the side component 1 and the vehicle frame 2 or the chassis in the installed state of the side component 1. The side component 1 has cutouts in fixing regions 8, into which cutouts projections on the air filter 5 can be clipped to the cutouts to secure the air filter 1. A side of the side component 1 opposite the receiving region for the air filter 5 has a receiving region for an exhaust air duct 7. The exhaust air duct 7 is of shell-shaped configuration at least in regions and has a basin-shaped region in the lower region in the installed state. The side component 1 and the exhaust air duct 7 form a closed channel in the installed state.

The side component 1 is configured so that the exhaust air duct 7 is pushed from the side into the side component 1 while being mounted, and can be clipped to the side component 1. FIG. 2 shows the pushing in from the side and connection to the side component.

FIG. 1 shows that the exhaust air duct 7 has a receiving region for a lane change assistant 6 in the installed state. The exhaust air duct 7 and the lane change assistant 6 are configured to be clipped to one another.

Figure 4:
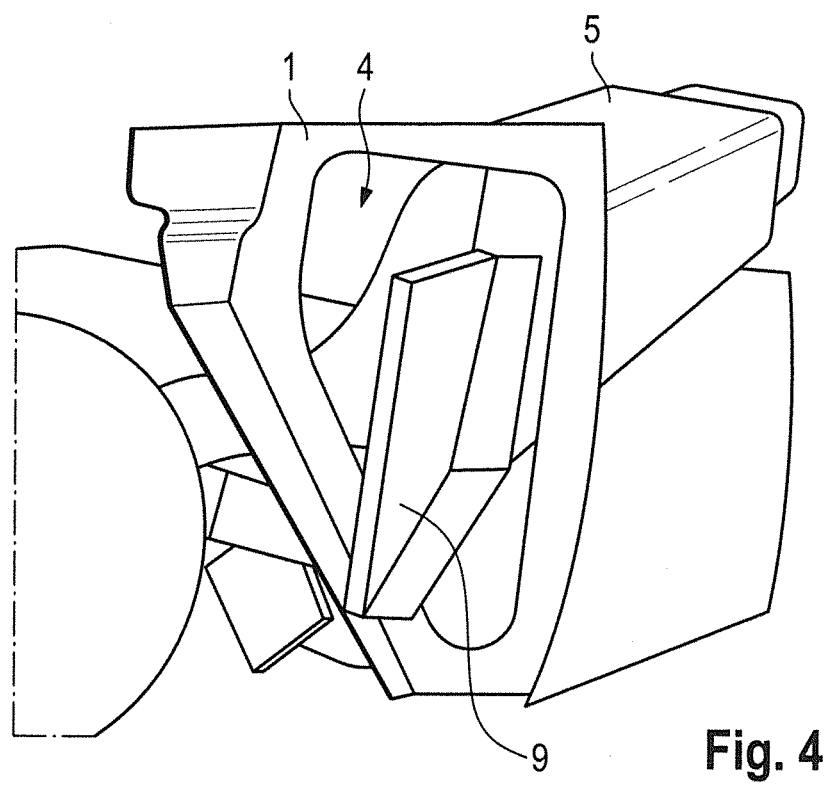
FIG. 4 shows the side component from FIGS. 1 to 3 during the air filter cartridge change.

FIGS. 3a-3d show the side component 1 of FIGS. 1 and 2 from four further perspectives, whereas FIG. 4 shows the side component 1 during the air filter cartridge change. To this end, the side component 1 has an opening 4 for access to the air filter cartridge 9 in the receiving region for the wheel arch liner 3 and hence on a side that faces the wheel arch liner 3 in the installed state. In particular, the opening 4 is dimensioned so that access can be gained to the air filter cartridge 9 of the air filter 5, and the air filter cartridge 9 can be pulled through the opening 4. As a result, merely dismantling of a vehicle wheel and the wheel arch liner 3 are required for an air filter cartridge change. In contrast, the prior art requires additional working steps to change the air filter cartridge 9 such as dismantling rear lights, the rear trim panel or a side Z-shaped holder.

LIST OF DESIGNATIONS

1 Side component
2 Vehicle frame
3 Wheel arch liner
4 Opening
5 Air filter
6 Lane change assistant
7 Exhaust air duct
8 Fixing region
9 Air filter cartridge

What is claimed is:

1. A motor vehicle having a rear end, the motor vehicle comprising:
   a vehicle frame, a part of the vehicle frame being at the rear end of the vehicle;
   a side component fastened to the vehicle frame, the side component including first, second and third receiving regions at positions on the side component that are spaced from one another, the second and third receiving regions defining openings extending through the side component;
   a wheel arch liner removably fastened to the first receiving region of the side component;
   an air filter mounted in the opening of the second receiving region of the side component, the air filter including an air filter cartridge accessible through the opening of the second receiving region when the wheel arch liner is removed; and
   an exhaust duct mounted to the opening of the third receiving region of the side component.

2. The motor vehicle of claim 1, wherein the side component and the exhaust air duct further have a receiving region for a lane change assistant.

3. The motor vehicle of claim 2, wherein the air filter, the lane change assistant and/or the exhaust air duct are configured to be clipped into the side component in an installed state.

4. The motor vehicle of claim 1, wherein the side component is manufactured from plastic.

5. The motor vehicle of claim 1, further comprising a lane change assistant mounted to the side component.

* * * * *